Nov. 21, 1944.    H. C. WERNER    2,363,373

SHAFT VIBRATION PICKUP

Filed March 5, 1942

WITNESSES:

INVENTOR
Harry C. Werner.
BY
ATTORNEY

Patented Nov. 21, 1944

2,363,373

UNITED STATES PATENT OFFICE 2,363,373

SHAFT VIBRATION PICKUP

Harry C. Werner, Pittsburgh, Pa., assignor to Westinghouse Electric & Manufacturing Company, East Pittsburgh, Pa., a corporation of Pennsylvania Application March 5, 1942, Serial No. 433,469

9 Claims. (Cl. 171—209)

My invention relates to vibration measuring and recording apparatus which is useful for measuring the unbalance and angular location of unbalance of a rotor while mounted in its bearings.

More specifically my invention relates to permanently mounted vibration measuring and recording apparatus for continuously measuring and recording vibration of a turbine shaft.

A considerable amount of time is required for balancing central station turbines because of the number of shutdowns required during the balancing operation. These include attaching and detaching balancing apparatus, changing trial weights and making corrections. When permanently installed as part of the supervisory control apparatus on a turbine, my invention will serve to give a warning of unusual and possibly dangerous operating conditions which would affect the vibration of the machine.

It is therefore an object of my invention to eliminate time consuming operations involved in balancing turbine rotors with portable balancing apparatus by providing permanently installed vibration measuring and recording apparatus on central station turbines.

A further object of my invention is to simpify existing balancing apparatus by providing permanently installed vibration measuring and recording apparatus on central station turbines.

Another object of my invention is to provide a special type pick-up unit having a shoe for slidably engaging the periphery of a rotating drive shaft so as to be very sensitive to the eccentricity of the rotating shaft such as caused by unbalance of the rotor, misalignment etc.

Other objects and advantages will become more apparent from a study of the following specification when considered in conjunction with the accompanying drawing, in which.

On low pressure turbines, vibrations can be measured either on the shaft or on the bearings. On high pressure turbines, however, the cylinder or bearing mounting is massive in comparison with the shaft and although the shaft may be vibrating several thousandths of an inch the bearings may be vibrating with an amplitude less than one-tenth of a thousandth of an inch. Likewise any change in vibration will be much greater on the shaft than on the bearing. The shaft then is the most sensitive element on which a vibration change may be detected.

The shaft vibration measuring apparatus measures the amplitude of the shaft vibration at known points along the shaft and in known transverse directions. Briefly the apparatus consists of a shaft vibration pick-up, an amplifier and a suitable measuring or recording device. Switching means is provided so that several vibration pick-ups can be used and records of each vibration made periodically. With the above apparatus a cycle may be established which will provide a period of operation for vibration recording for each of the several vibration pick-ups in the system. A long off period may also be provided in the cycle between the last and first vibration pick-ups to identify each pick-up on the record.

Figure 1:
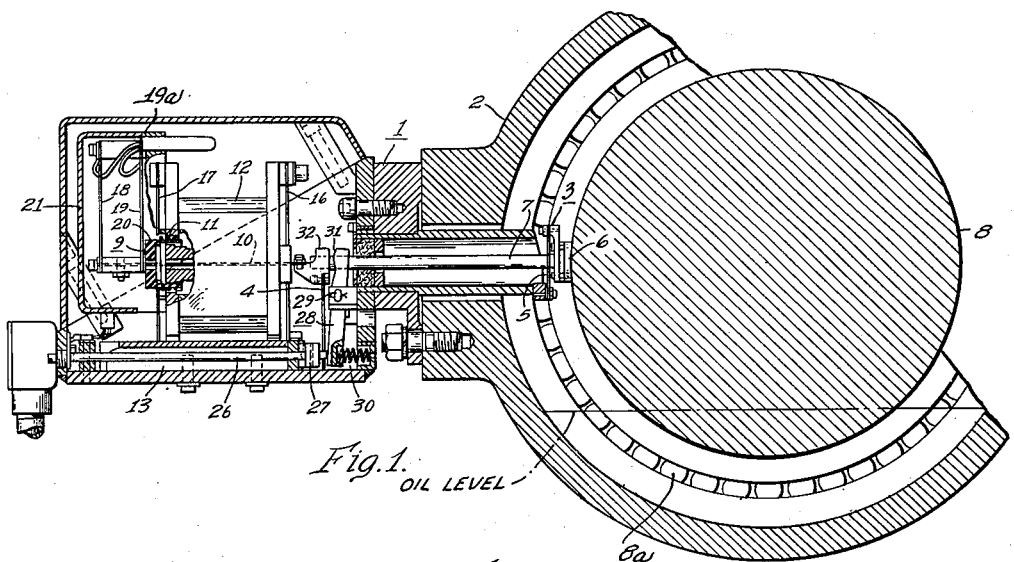
Figure 1 is a sectional view of a vibration measuring device embodying the principles of my invention showing its mounting on the turbine frame, and the pick-up shoe riding on the shaft.
Figure 3:
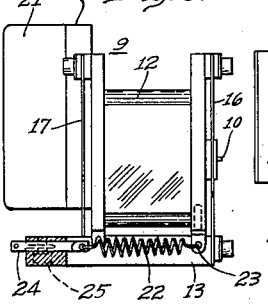
Fig. 3 is a detail of the seismically supported permanent magnet showing the adjustable balance spring by which the spring mounted mass can be balanced for any orientation of the vibration measuring or pick-up device.
Figure 2:
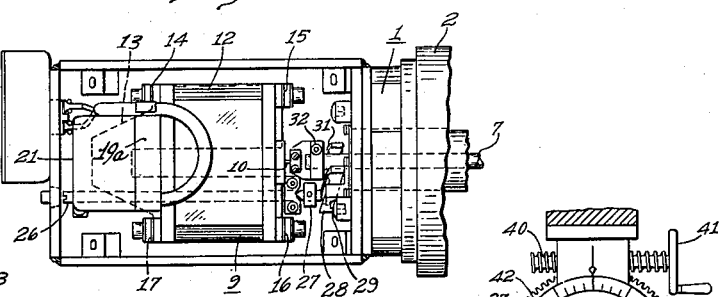
Fig. 2 is a top view of the vibration measuring device with the cover removed.

Referring to the drawing and more particularly to Fig. 1, the operation of the vibration pick-up is as follows: The pick-up frame assembly 1 which is bolted to the turbine frame 2 supports the shoe assembly 3 through the flat springs 4 and 5. These springs also supply the force necessary to hold the shoe against the shaft under all conditions of shaft vibration. The shoe 6 rigidly secured to the end of the shaft 7 rides against the turbine shaft 8 at a point next to the turbine shaft bearing 8a and receives its lubrication from the oil which is thrown from the side of the bearing. The weight of the shoe assembly 3 and the pick-up coil assembly 9 in direct mechanical tie by means of the connecting rod 10 and the pressure of the flat supporting springs 4 and 5 is made very light to reduce wear of the shoe 6 to a minimum. Vibration of the shaft is transmitted to the pick-up coil 11 by means of the connecting rod 10. The absolute motion of the pick-up coil 11 is therefore the same as that of the shoe or the shaft. The pick-up coil 11 is suspended in the magnetic air gap of the permanent magnet 12 in such a way that its vibratory motion resulting from the shaft vibration generates a voltage in the coil which is proportional to the product of the amplitude and frequency of the vibration. The permanent magnet 12 is supported on the frame 13 by the four flat springs 14, 15, 16 and 17 in order to minimize transmission of vibrations of the frame. Parallel spaced flat springs 18 and 19 are rigidly secured at one end to a support 19a which is secured to the permanent magnet 12 and at the other end to the coil supporting form 20 in a manner to support and space the pick-up coil 11 in the magnetic air gap of the permanent magnet 12. At the same time the springs 18 and 19 provide a flexible connection between the coil supporting structure and the permanent magnet 12 to allow relative movement therebetween. A cover portion 21 encloses this assembly to prevent dirt from getting into the air gap between the pick-up coil 11 and the permanent magnet 12.

Because of space limitations on the turbine, it is necessary to make the vibration pick-up so that it can be mounted for reading vibrations in any one direction from horizontal to vertical. For this purpose an adjustable balance spring 22 has been provided. One end of spring 22 is attached to the permanent magnet 12 at 23; the other end is fastened to a rod 24 extending axially of the spring through a suitable hole in the frame 13 in which it is clamped by the screw 25. By properly increasing or decreasing the tension of spring 22, the spring mounted mass can be balanced for any orientation of the pick-up unit. This, of course, is done only once in mounting the assembly on the turbine for the first time. If for any reason it is desired to lift the shoe 6 from the turbine shaft, rotation of the cam rod 26 driving cam 27 will move cam rod 26 to the right rotating forked member 28 counterclockwise about its pivot 29 against the bias of spring 30. The surface 31 of forked member 28 is brought into engagement with clamp 32 sliding the shoe assembly 3 to the left and moving the shoe 6 away from the turbine shaft 8.

The clamp 32 connects the shaft 7 to the rod 10 in order that movement of the rod 10 with respect to the frame assembly 1 will be transmitted to the coil 11. In this respect it will be noted that the flat leaf springs 4 and 5 which mount the shaft 7 on the support 1 and bias the shoe 6 into engagement with the rotating shaft 8, allow a single degree of freedom of movement to the shaft 7. That is, vibratory movement of the shaft 8 will impart movement to the shaft 7 in the plane of Fig. 1. This movement causes a movement of the coil 11 with respect to the armature 12 which may be utilized to generate a measurable electric force proportional to the amplitude of vibration of the shaft 8 and at a frequency the same as the frequency of the vibration of shaft 8.

Since the frame assembly 1 of the pick-up unit is bolted to the turbine frame, it is, of course, desirable that vibration of the turbine frame 2 should not effect relative movement between the coil 11 and armature 12 and thereby cause erroneous indications of the vibration of the shaft 8. The mounting of the armature 12 and coil 11 is effective to prevent such erroneous indications. The flat leaf springs 14, 15, 16 and 17 provide a seismic mounting for the armature 12 which will be effective in most cases to maintain the mass of the armature 12 stationary with respect to the frame assembly 1. The flat leaf springs 18 and 19, of course, will flex upon movement of the shoe 6 and the parts intermediate the coil 11 due to vibration of the shaft 8. Should movement be imparted to the armature 12 due to vibration of the turbine housing 2 a like movement will be imparted to the coil 11 due to the springs 18 and 19 connecting the coil 11 to the armature 12. In this manner movement of the housing 2 is ineffective to cause movement of the coil 11 with respect to the armature 12 and no readings will be had which will erroneously indicate vibration of the shaft 8.

Figure 4:
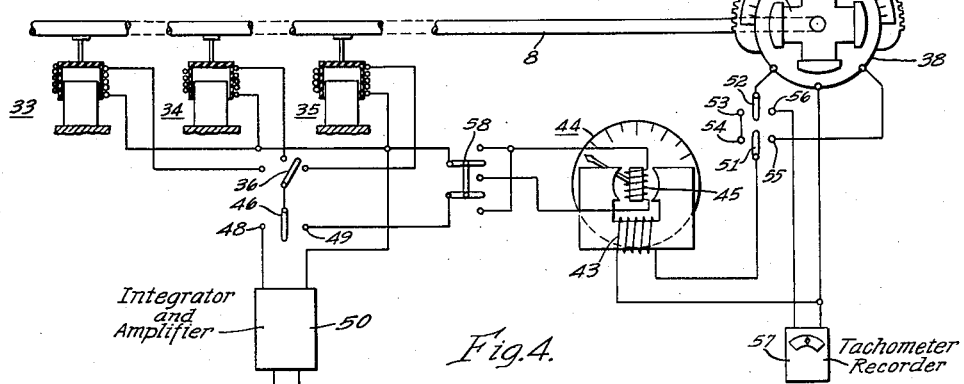
Fig. 4 is a schematic diagram of the unbalance measuring system.

In Fig. 4 is shown a schematic diagram of the elements used with this method of vibration measurement. Three vibration pick-ups 33, 34 and 35 are indicated but it is to be understood that the system is not necessarily limited to this number. These pick-up units are located at predetermined points along the turbine shaft 8 and are connected into the metering circuit by the selector switch 36. Turbine shaft 8 is in direct mechanical couple with the rotor 37 of a two phase sine wave generator 38 the stator of which is rotatable. A calibrated dial 39 fixed to rotate with the stator is provided for accurate reading of the angular displacement of the stator. A worm 40, driven by a hand wheel 41, engages a worm wheel 42 rigidly attached to the stator assembly to provide mechanical means for adjusting the angular position of the generator stator.

The operation of the system is as follows: The output of one of the phases of the two phase sine wave generator 38 is put into the current coil 43 of wattmeter 44 and the electric vibration pick-ups, which are positioned against the vibrating turbine shaft 8, each selectively has its output put into the voltage coil 45 of said wattmeter. Since the indication of the wattmeter is proportional to the product of the voltage amplitudes of equal frequencies across its two coils multiplied by the cosine of the angle between them, it is possible with a given pick-up voltage to make the meter indicate zero or a maximum by rotating the stator of the sine wave generator to certain positions where the two voltages on the wattmeter are out of phase or in phase respectively. The zero reading requires an accurate adjustment of the stator position, and the angular position of the stator for this reading is an indication of the phase angle of the pick-up voltage, which voltage bears a fixed relationship to the vibratory motion; we may therefore say, that the angular position of the stator is the phase angle of the vibratory motion. Shifting the location of the generator winding 90° from the zero position gives a maximum deflection of the wattmeter, and with the generator current amplitude always held constant, this deflection is an indication of the amplitude of the vibration being measured. Since the voltage across the current coil of the wattmeter is a pure sine-wave of running frequency, this method of measurement effectively filters out all vibration harmonics except those corresponding to running frequency. Selector switch 36 is used to connect each electrical vibration pick up 33, 34, and 35 into the metering circuit in periodic rotation. Switching means indicated at 46 connects the output of the electrical vibration pick-ups to the vibration indicator or recorder 47 when thrown to engage contact 48 and to the wattmeter circuit when thrown to engage contact 49. When engaging contact 48, switch 46 feeds the voltage generated in a pick-up into an electrical integrator and amplifier 50 which operates the recorder 47. The integrator serves to make the amplitude reading independent of frequency or R. P. M. of the machine and therefore proportional to the actual amplitude of vibration. As an alternative of angularly shifting a coil through 90°, two generator coils, 90° apart may be used in conjunction with a switch whereby the output of either coil of this two phase generator may be connected to the meter. By noting the values of the component voltages which are 90 apart these values may be plotted and the resultant voltage may be deduced as well as its phase angle with respect to the rotor.

There are two windings on the generator stator, and they are identical except for being 90° apart. After the stator of the generator is rotated to a position where the wattmeter indicates zero, instead of rotating the stator 90° from that position to obtain the maximum wattmeter indication, the second winding which is already displaced 90° can be switched across the current coil of the wattmeter in place of the first winding. This is accomplished by means of the switch indicated at 51. Assuming switch 52 being thrown to engage contact 53 and switch 51 engaging contact 54 and the generator stator adjusted for zero wattmeter indication, maximum wattmeter indication may be obtained by moving switch 51 to engage contact 55 cutting out the winding which gave the zero wattmeter indication from the circuit and cutting in the winding displaced 90° therefrom. With switch 52 engaging contact 56 the balancing circuit is deenergized, the output of the sine wave generator being put into the tachometer recorder 57 for recording of the turbine R. P. M. Electrical tachometers are standardly used on turbines, however, a two phase sine wave tachometer, being employed in my balancing apparatus will replace the one used at present.

It is possible to obtain zero wattmeter indications for two different positions of the generator stator; one of these however, is incorrect and when the stator windings are switched for maximum wattmeter indication, the wattmeter will indicate negatively. In order to avoid resetting the generator stator for correct wattmeter zero indication a reversing switch 58 in circuit with the electrical vibration pick-ups 33, 34, and 35 and the voltage coil 45 of the wattmeter 44 may be thrown to its opposite position thereby reversing the flow of current through the voltage coil of the wattmeter giving a positive wattmeter indication.

With the combination of tachometer, pick-ups and wattmeter as hereinbefore described, the unbalance in the turbine can be determined at any time while the machine is in normal operation. This can be done by simply switching the pick-ups and tachometer into the balancing meter circuit and taking the necessary readings. The calibration of the turbine can be determined once and for all the first time it is balanced, and no shut down is required for either attaching the apparatus or changing trial weights. In other words, it is only necessary to shut down once while inserting the correction weights. This might be done at a regular shut down period. With apparatus of this type the vibration and tachometer recorders would be permanently installed on the supervisory panel board. The balancing wattmeter with its component switches can be mounted on the same panel or be made up as a portable unit which would be plugged into the circuit on the board. As a result of this permanent installation the balancing circuit is much simplified over present portable balancing systems because of the singe speed requirements. In other words, speed and sensitivity dials are eliminated.

I am, of course, aware that others, particularly after having had the benefits of the teachings of my invention, may devise other devices embodying my invention, and I, therefore, do not wish to be limited to the specific showing made in the drawings and the descriptive disclosure hereinbefore made, but wish to be limited only by the scope of the appended claims.

I claim as my invention:

1. Apparatus for detecting the eccentricity of a rotating shaft supported by bearings comprising, in combination, electromagnetic pick-up means having a stationary element, means resiliently securing said stationary element with respect to one of the bearings, a movable element, one of said elements including a magnet and the other, a pick-up coil, whereby relative movement between said elements induces a measurable voltage in the coil, said movable element having a portion including an arcuate shoe for slidably engaging the periphery of the shaft, and spring means for yieldably urging said shoe into continuous engagement with said shaft periphery.

2. Apparatus as recited in claim 1 in which said second mentioned means includes a frame portion adjacent one of said bearings having an oil bath for lubricating the shaft and the surface of said shoe.

3. Apparatus for detecting the eccentricity of a rotating shaft supported by a frame including a pair of bearings, comprising, in combination, electromagnetic pick-up means having a relatively stationary magnet supported by said frame and a pick-up coil having a rod secured thereto, a shoe element located at the end of the rod, spring means for biasing said shoe into continuous contacting relationship with a peripheral portion of said shaft, and means for adjusting the tension of said spring means.

4. Apparatus as recited in claim 3 together with an oil reservoir formed in a portion of said frame for lubricating the shaft and the surface of said shoe thereby minimizing frictional resistance.

5. Apparatus as recited in claim 3 together with releasing means including a lever, a spring for biasing said lever, and cam means for moving an end of said lever against the bias of said spring and of said spring means so as to remove said shoe from said shaft.

6. Apparatus as recited in claim 3 in which said rod protrudes through an opening in said frame, said electromagnetic pick-up means being resiliently secured to said frame.

7. Apparatus for measuring the unbalance of a rotating shaft comprising a frame mounted in position with respect to said shaft, a pick-up shoe for engagement with said shaft, a motion transmitting rod carrying said shoe, a pair of flat springs in spaced relation mounting said motion transmitting rod on said frame, said springs functioning to maintain said shoe in engagement with said shaft and to permit movement of said rod with respect to said frame by movement imparted to said shoe due to unbalance of said shaft, and electrical pick-up means comprising a field magnet mounted on said frame, a pick-up coil mounted for movement relative to said field magnet, and means connecting said coil to said rod for effecting relative movement between said coil and field magnet in accordance with movement of said rod due to unbalance movement of said shaft.

8. Apparatus for measuring the unbalance of a rotating shaft comprising a frame mounted in position with respect to said shaft, a pick-up shoe for engagement with said shaft, a motion transmitting rod carrying said shoe, a pair of flat springs in spaced relation mounting said motion transmitting rod on said frame, said springs functioning to maintain said shoe in engagement with said shaft and to permit movement of said rod with respect to said frame by movement imparted to said shoe due to unbalance of said shaft, and electrical pick-up means comprising a field magnet, a plurality of flat leaf springs mounting said field magnet on said frame, a pick-up coil, a plurality of flat leaf springs mounting said coil on said field magnet, and means connecting said coil to said rod for effecting relative movement between said coil and field magnet in accordance with movement of said rod due to unbalance movement of said shaft, the spring mountings of said coil and field magnet being effective to prevent relative movement of said coil and field magnet due to movement of said frame with respect to said shaft.

9. Apparatus for measuring the unbalance of a rotating shaft comprising a frame mounted in position with respect to said shaft, a pick-up shoe for engagement with said shaft, a motion transmitting rod carrying said shoe, a pair of flat springs in spaced relation mounting said motion transmitting rod on said frame, said springs functioning to maintain said shoe in engagement with said shaft and to permit movement of said rod with respect to said frame by movement imparted to said shoe due to unbalance of said shaft, and electrical pick-up means comprising a field magnet, a plurality of flat leaf springs mounting said field magnet on said frame, an adjustable spring interconnecting said field magnet and said frame for adjustably biasing said field magnet against the forces of gravity, a pick-up coil, a plurality of flat leaf springs mounting said coil on said field magnet, and means connecting said coil to said rod for effecting relative movement between said coil and field magnet in accordance with movement of said rod due to unbalance movement of said shaft, the spring mountings of said coil and field magnet being effective to prevent relative movement of said coil and armature due to movement of said frame with respect to said shaft.

HARRY C. WERNER.